United States Patent
Kammer et al.

(10) Patent No.: US 8,240,990 B2
(45) Date of Patent: Aug. 14, 2012

(54) APPARATUS AND METHOD FOR REDUCING ASYMMETRIC ROTOR LOADS IN WIND TURBINES DURING SHUTDOWN

(75) Inventors: Leonardo Cesar Kammer, Niskayuna, NY (US); Hubert Oing, Berlin (DE)

(73) Assignee: General Electric Company, Niskayuna, NY (US)

( * ) Notice: Subject to any disclaimer, the term of this patent is extended or adjusted under 35 U.S.C. 154(b) by 1482 days.

(21) Appl. No.: 11/952,073

(22) Filed: Dec. 6, 2007

(65) Prior Publication Data

US 2009/0148286 A1 Jun. 11, 2009

(51) Int. Cl.
*F03D 7/04* (2006.01)
*B63H 3/00* (2006.01)

(52) U.S. Cl. .................. 416/1; 416/38; 416/41; 416/43; 416/61; 416/155

(58) Field of Classification Search ................ 416/1, 38, 416/40, 41, 43, 44, 61, 155
See application file for complete search history.

(56) References Cited

U.S. PATENT DOCUMENTS

| 5,584,655 | A | 12/1996 | Deering |
| 7,118,339 | B2 | 10/2006 | Moroz et al. |
| 2007/0116572 | A1* | 5/2007 | Barbu et al. ............... 416/132 B |

FOREIGN PATENT DOCUMENTS

WO 2006007838 1/2006

* cited by examiner

*Primary Examiner* — Edward Look
*Assistant Examiner* — Aaron R Eastman
(74) *Attorney, Agent, or Firm* — Ann M. Agosti

(57) ABSTRACT

An apparatus and method for reducing asymmetric rotor load in a wind turbine includes calculating a time delay for pitching each blade toward feather upon initiation of a shutdown condition. The blades with the larger blade angle begin moving toward feather with an initial pitch rate, while the blade with the smallest blade angle begins moving toward feather with a final pitch rate. Once all the blades have reached approximately an identical blade angle, the blades move simultaneously together to feather at the final pitch rate. By introducing the time delay for pitching the blades having higher blade angles at the final pitch rate, a simple, time-based correction of initial conditions during shutdown reduces the extreme loads on turbine components.

8 Claims, 4 Drawing Sheets

APPARATUS AND METHOD FOR REDUCING ASYMMETRIC ROTOR LOADS IN WIND TURBINES DURING SHUTDOWN

BACKGROUND

This invention relates generally to wind turbines, and more particularly to methods and apparatus for efficiently reducing load in wind turbines.

Recently, wind turbines have received increased attention as an environmentally safe and relatively inexpensive alternative energy source. With this growing interest, considerable efforts have been made to develop wind turbines that are reliable and efficient.

Generally, a wind turbine includes a rotor having multiple blades. The rotor is mounted within a housing or nacelle, which is positioned on top of a truss or tubular tower. Utility grade wind turbines (i.e., wind turbines designed to provide electrical power to a utility grid) can have large rotors (e.g., 80 or more meters in diameter). Blades on these rotors transform wind energy into a rotational torque or force that drives one or more generators, rotationally coupled to the rotor through a gearbox. The gearbox may be used to step up the inherently low rotational speed of the turbine rotor for the generator to efficiently convert mechanical energy to electrical energy, which is fed into a utility grid. Some turbines utilize generators that are directly coupled to the rotor without using a gearbox.

Asymmetric loading across wind turbine rotor occurs due to vertical and horizontal wind shears, yaw misalignment, and turbulence. Horizontal wind shear, yaw misalignment, and natural turbulence are among the primary drivers of asymmetric loads on a wind turbine rotor. These loads, along with the loads from vertical and/or horizontal wind shears, are contributors to extreme loads and the number of fatigue cycles accumulated by a wind turbine system. Asymmetric load control can be used to reduce extreme loads and fatigue cycles via cyclic actuation of each individual blade pitch angle.

A DC voltage source, such as a battery, is provided in the rotor blade adjustment system and is directly applied to the blade adjustment drive when the power grid fails, thereby assuring power at all times to the blade adjusting drive. If an emergency shut down is triggered, which usually requires auxiliary-powered blade pitching, the rotor-imbalance compensation is no longer active, and all blades start pitching towards feather with the same pitch rate, but starting from different initial blade angles. This uncorrected blade asymmetry exacerbates the imbalance in rotor loads at certain rotor azimuths, creating extreme loads that dimension the design of tower-top components.

SUMMARY OF THE INVENTION

Briefly, a method for reducing load in a wind turbine having a plurality of blades, each blade having a blade angle, the method comprising calculating a time delay for switching at least one blade toward feather from an initial pitch rate to a final pitch rate upon initiation of a shutdown condition.

In another aspect of the invention, a wind turbine comprises a rotor having a plurality of blades and a hub. The wind turbine also comprises a control system configured to measure a pitch angle for each blade, wherein the control system calculates a time delay for switching at least one blade toward feather from an initial pitch rate to a final pitch rate upon initiation of a shutdown condition, wherein the initial pitch rate is smaller than the final pitch rate.

In yet another aspect of the invention, a method for reducing load in a wind turbine having a plurality of blades comprises calculating a time delay for pitching at least one blade toward feather upon initiation of a shutdown condition.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
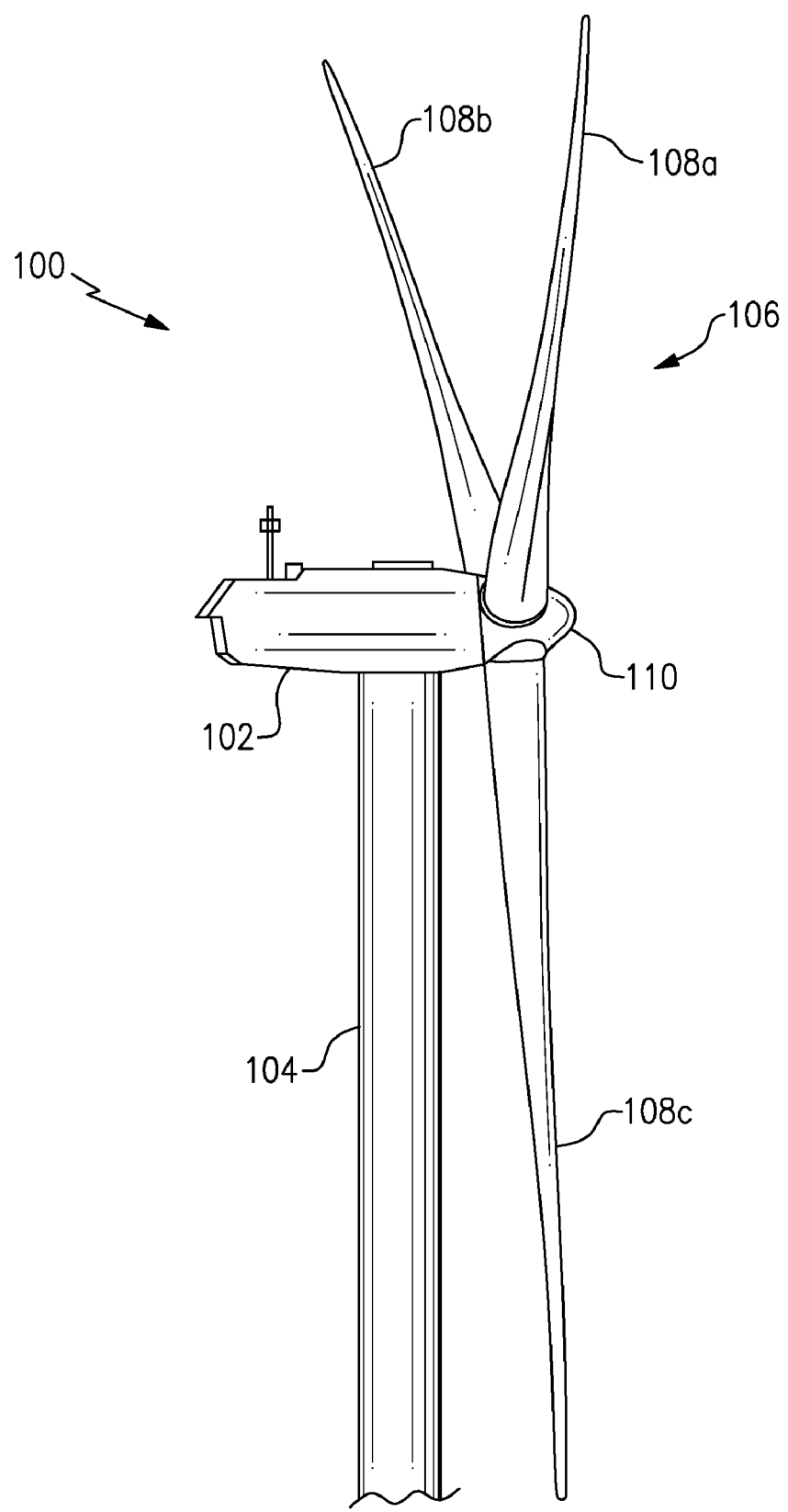
FIG. 1 is a drawing of an exemplary configuration of a wind turbine.

Referring to the drawings wherein identical reference numerals denote the same elements throughout the various views, Referring now to FIG. 1, a wind turbine 100 in some configurations comprises a nacelle 102 housing a generator (not shown in FIG. 1). A nacelle 102 is mounted atop a tall tower 104, only a portion of which is shown in FIG. 1. The wind turbine 100 also comprises a rotor 106 that includes a plurality of rotor blades 108 attached to a rotating hub 110. Although the wind turbine 100 illustrated in FIG. 1 includes three rotor blades 108, there are no specific limits on the number of rotor blades 108 required by the invention.

Figure 2:
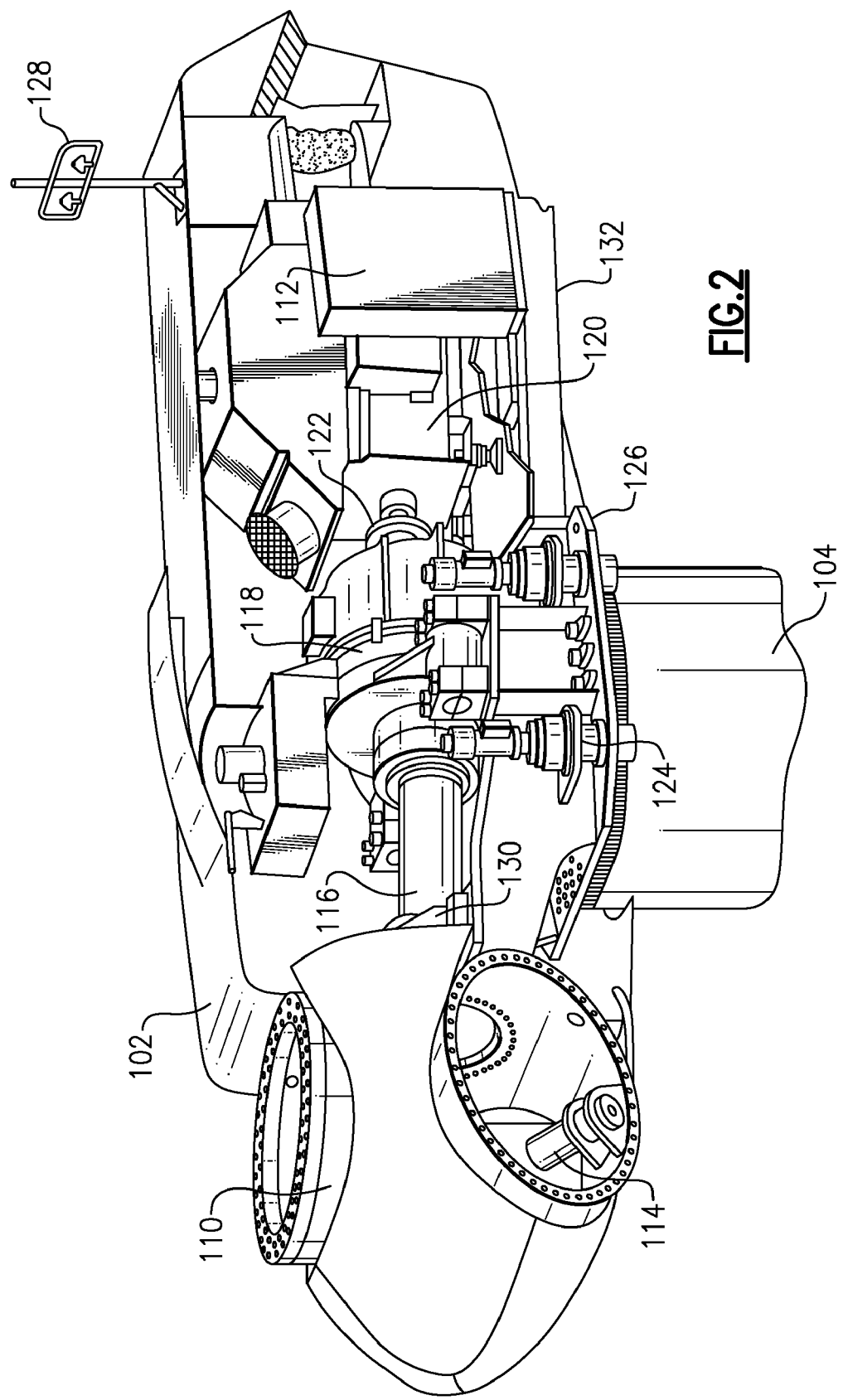
FIG. 2 is a cut-away perspective view of a nacelle of the exemplary wind turbine configuration shown in FIG. 1.

Referring now to FIG. 2, various components are housed in the nacelle 102 atop the tower 104 of the wind turbine 100. The height of the tower 104 is selected based upon factors and conditions known in the art. In some configurations, one or more microcontrollers within the control panel 112 comprise a control system are used for overall system monitoring and control including pitch and speed regulation, high-speed shaft and yaw brake application, yaw and pump motor application and fault monitoring. Alternative distributed or centralized control architectures are used in some configurations.

The control system provides control signals to a variable blade pitch drive 114 to control the pitch of blades 108 (not shown in FIG. 2) that drive the hub 110 as a result of wind. In the illustrated embodiment, the hub 110 receives three blades 108, but other configurations can utilize any number of blades. The pitches of the blades 108 are individually controlled by blade pitch drive 114. The hub 110 and blades 108 together comprise wind turbine rotor 106.

In case of loss of grid power, it would be desirable to be able to control the pitch of blades 108 to assist with braking during shutdown. In this case, there will not be power available to operate the variable blade pitch drive 114. Therefore, it is desirable that a battery (not shown) is provided in the rotor 106 to provide emergency backup power for the variable blade pitch drive 114. Battery packs (not shown) may be provided in the hub 110 to provide backup power to the variable blade pitch drive 114 for each of the blades 108.

The drive train of the wind turbine includes a main rotor shaft 116 (also referred to as a "low speed shaft") connected to the hub 110 and a gear box 118 that, in some configurations, utilizes a dual path geometry to drive a high speed shaft enclosed within gear box 118. The high speed shaft (not shown in FIG. 2) is used to drive the generator 120. In some configurations, rotor torque is transmitted by a coupling 122. The generator 120 may be of any suitable type, for example, a wound rotor induction generator. In some configurations, a gearbox is not used, and instead, the rotor shaft 116 directly drives the generator 120.

A yaw drive 124 and a yaw deck 126 provide a yaw orientation system for wind turbine 100. In some configurations, the yaw orientation system is electrically operated and controlled by the control system in accordance with information received from sensors used to measure shaft flange displacement, as described below. However, a wind vane 128 may be provided as a back-up or redundant system for providing information for the yaw orientation system. In some configurations, the yaw system is mounted on a flange provided atop tower 104.

Figure 3:
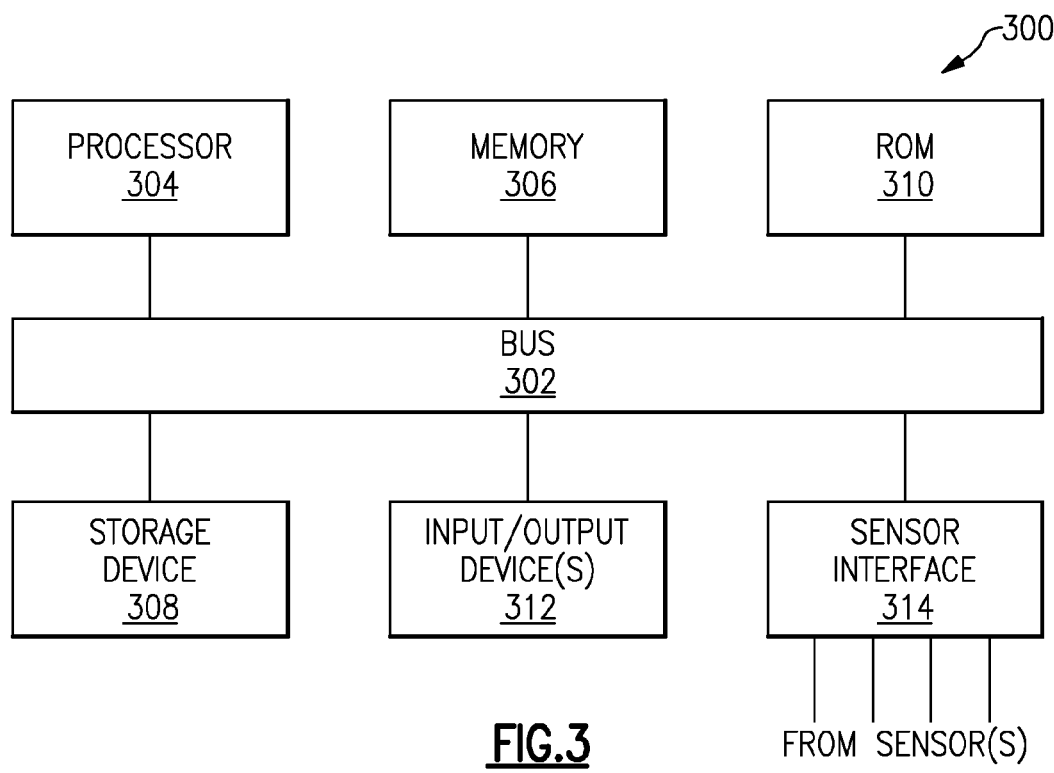
FIG. 3 is a block diagram of an exemplary configuration of a control system for the wind turbine configuration shown in FIG. 1.

Referring now to FIG. 3, a control system 300 for the wind turbine 100 includes a bus 302 or other communications device to communicate information. Processor(s) 304 are coupled to the bus 302 to process information, including information from sensors configured to measure displacements or moments. The control system 300 further includes random access memory (RAM) 306 and/or other storage device(s) 308. The RAM 306 and storage device(s) 308 are coupled to the bus 302 to store and transfer information and instructions to be executed by processor(s) 304. RAM 306 (and also storage device(s) 308, if required) can also be used to store temporary variables or other intermediate information during execution of instructions by processor(s) 304. The control system 300 can also include read only memory (ROM) and or other static storage device 310, which is coupled to the bus 302 to store and provide static (i.e., non-changing) information and instructions to processor(s) 304. The input/output device(s) 312 can include any device known in the art to provide input data to the control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, and the like. In some embodiments, hard-wired circuitry can be used in place of or in combination with software instructions. Thus, execution of sequences of instructions is not limited to any specific combination of hardware circuitry and software instructions. The sensor interface 314 is an interface that allows the control system 300 to communicate with one or more sensors. The sensor interface 314 can be or can comprise, for example, one or more analog-to-digital converters that convert analog signals into digital signals that can be used by the processor(s) 304.

Figure 4:
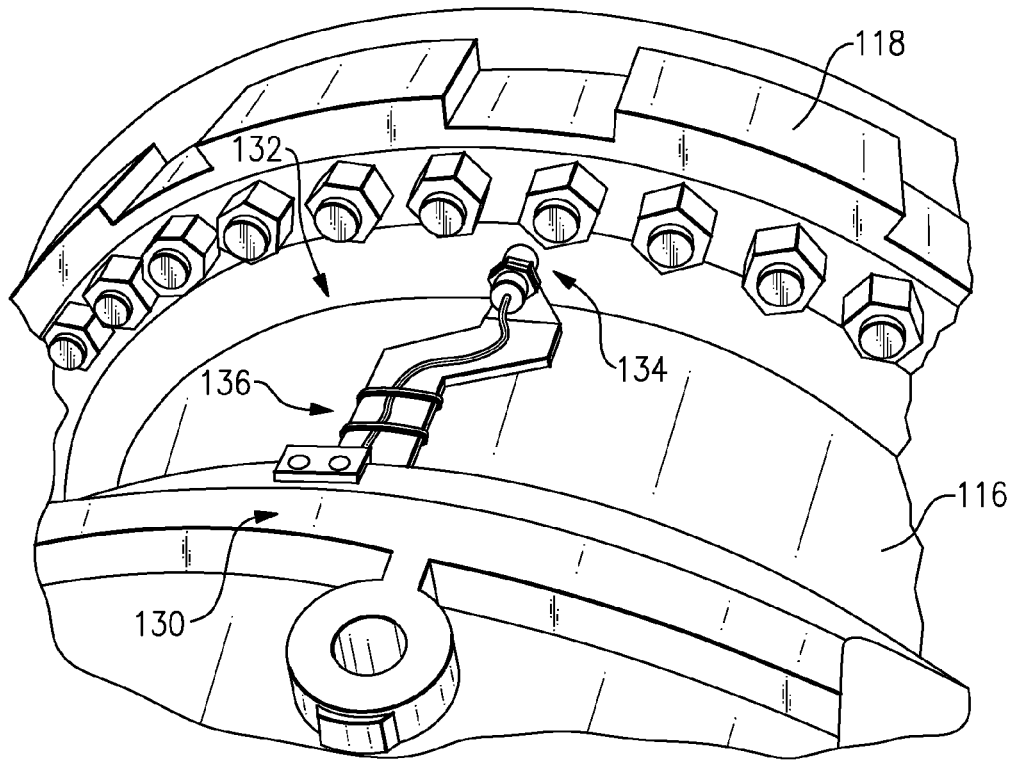
FIG. 4 is a perspective view of a portion of the main rotor shaft and a sensor used in some configurations of the invention.

Asymmetric loads acting on wind turbine rotor blades 108 translate into moments acting on hub 110 and subsequently low speed shaft 116. Referring to FIG. 4, these moments are manifested as deflections or strains at the main shaft flange 132. The sensors 134, such as proximity sensors, are utilized to measure the main shaft flange 132 displacement. In some configurations, each sensor 134 is mounted on a sensor bracket 136 that is attached to main bearing 130. Sensor readings from the sensors 134 indicating measured displacements or moments are used by the control system to determine a pitch command for each rotor blade 108 to reduce or counter asymmetric rotor loading and a favorable yaw orientation to reduce pitch activity. In some configurations, at least three sensors are used to measure displacements of main shaft flange 132 of wind turbine 100 resulting from asymmetric loads. Also in some configurations, the sensors 134 are proximity sensors that measure the main shaft flange 132 displacement relative to a non-deflecting reference frame, for example, the main bearing 130. Some configurations utilize four sensors with 90 degree spacing to measure displacements of shaft flange 132.

A feedback control system is used in some configurations to reduce asymmetric loads from acting on the rotor 106, the shaft 116, and from being translated to other turbine components. During normal power production, it has become common for wind turbines to operate individual blade pitch control, either independently or asymmetrically, so as to reduce loads imbalance in the rotor 106 caused by wind shear, yawed flow, etc. The imbalance in pitch angles among the blades 108 is sued to favorably compensate for the imbalances in the rotor loads, which requires constant pitching of the blade as a function of rotor azimuth. If an emergency shutdown is triggered, which usually requires auxiliary-powered blade pitching, the rotor imbalance compensation is no longer active, and all the blades 108 start pitching towards feather with the same pitch rate (velocity as a function of time), but starting from different initial blade angles. This uncorrected blade asymmetry exacerbates the imbalance in rotor loads at certain rotor azimuths, thereby creating extreme loads that dimension the design of the tower-top components.

As shown in FIG. 1, for example, the blades 108a and 108b are located in an upper position, while the blade 108c is located in the lower position at that moment in time. If a shutdown is triggered, the blades 108a and 108b may be pitched closer to feather than the blade 108c to compensate for rotor imbalance. For example, the blade 108a may have a pitch angle, for example, of about 2 degrees, the blade 108b may have a pitch angle, for example, of about 4 degrees, and the blade 108c may have a pitch angle, for example, of about 0 degrees. In conventional systems, all the blades will start pitching towards feather with the same pitch rate, but starting from different initial blade angles, thereby exacerbating the imbalance in rotor loads.

An aspect of the invention is to reduce asymmetric rotor loads due to this uncorrected blade asymmetry during initiation of a shutdown condition. This is accomplished by imposing a time delay on the pitching of the blades 108 that are angled closer to feather than the other blades 108 of the turbine 100. This time delay imposed on each blade can be described by the following equation:

$$\text{Delay}(i) = [\text{Angle}(i) - \text{Min Angle}]/\text{Auxiliary-Power Pitch Rate} \qquad \text{(Eq. 1)}$$

where,

Delay (i)=time delay for i-th blade (sec),

Angle (i)=blade angle of the i-th blade at initiation of the shutdown condition (degrees), Min Angle=minimum angle among all blade angles at initiation of the shutdown condition (degrees), and Auxiliary-Power Pitch Rate=pitch rate under auxiliary power (degrees/sec).

In the example given above, and assuming that the pitch rate under auxiliary power is about 8 degrees/sec, for example, the time delay for each blade can be calculated is as follows:

Delay (blade 108a)=(2−0)/8=0.25 seconds

Delay (blade 108b)=(4−0)/8=0.50 seconds, and

Delay (blade 108c)=(0−0)/8=0.00 seconds.

Thus, the pitch command from control system 300 to move the blade 108c toward feather will begin immediately after a shutdown has been triggered, whereas the pitch command to move the blade 108a toward feather will begin about 0.25 seconds after shutdown initiation, and the pitch command to move the blade 108b toward feather will begin about 0.50 seconds after shutdown initiation. After 0.50 seconds, all blades 108 will move toward feather together at the same pitch rate, thereby reducing the imbalance in rotor loads. Thus, the blade 108 with the lowest pitch angle begins to move immediately upon shutdown initiation, while the pitch command for other blades is delayed until the appropriate time. In other words, the blade 108 with the highest pitch angle does not begin to pitch until all the other blades have reached the same pitch angle. Tests indicate that by using the method of the invention, the open-loop pitching of the blades decreases the extreme loads on an average of about 10% during shutdown, as compared to conventional systems.

It will be appreciated that the invention can be practiced with pitching the blades 108 at different initial pitch rates until the blades reach approximately an identical blade angle, and then the pitching of the blades 108 may continue at the same final pitch rate. The time delay for pitching the blades at the final pitch rate can be determined by the following equation:

$$\text{Delay}(i) = [\text{Angle}(i) - \text{Min Angle}]/[\text{Final Pitch Rate} - \text{Initial Pitch Rate}] \quad (\text{Eq. 2})$$

where,

Delay (i)=the time delay for i-th blade to switch from the initial pitch rate to the final pitch rate, Angle (i)=the blade angle of the i-th blade upon initiation of the shutdown condition, Min Angle=a minimum angle for the plurality of blades upon initiation of the shutdown condition, Initial Pitch Rate=the initial pitch rate under auxiliary power, and Final Pitch Rate=the final pitch rate under auxiliary power.

Figure 5:
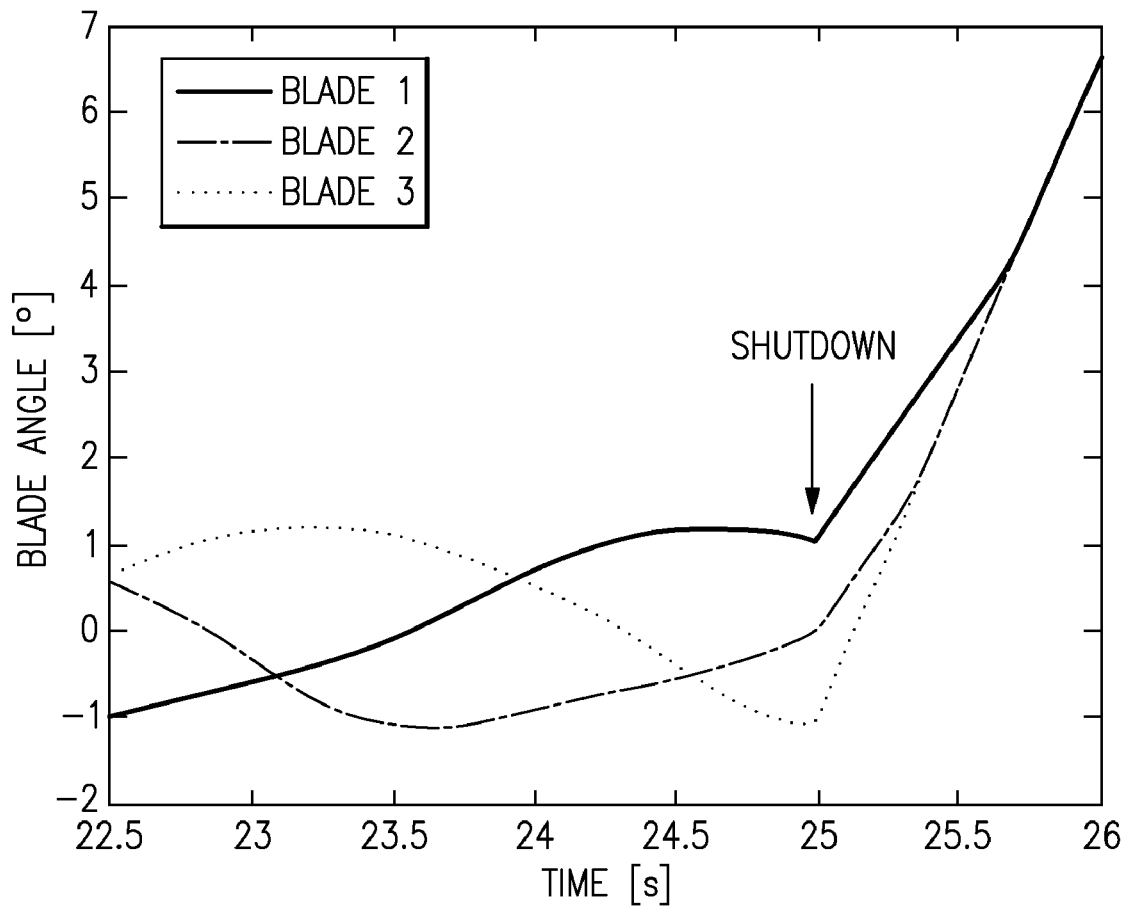
FIG. 5 is a graph illustrating a method of the invention that calculates a time delay for switching a pitch rate of at least one blade toward feather upon an initiation of a shutdown condition.

An example of this embodiment of this aspect of the invention is shown in FIG. 5. As shown, all the blades 108 have a different blade angle upon initiation of a shutdown condition at 25 seconds. For example, the blade 108a may have a blade angle of about one (1) degrees, the blade 108b may have a blade angle of about zero (0) degrees, and the blade 108c may have a blade angle of about minus one (−1) degrees. Because the blades 108a and 108b have a larger blade angle than the blade 108c, the blades 108a and 108b begin to pitch toward feather at a first, initial pitch rate, whereas the blade 108c, which has the smallest blade angle of −1 degrees, begins pitch at a second, final pitch rate. It is noted that the initial pitch rate is slower than the final pitch rate. Thus, all the blades 108 that have a larger blade angle begin to pitch at a smaller pitch rate toward feather until they have approximately the same or identical blade angle as the blade with the smallest blade angle upon initiation of the shutdown condition. In the example, the time delay for each blade 108 can be calculated from Eq. 2 as follows:

Time delay (blade 108a)=[1 deg−(−1) deg]/[7.5 deg/s−4.5 deg/s]=⅔ s

Time delay (blade 108b)=[0 deg−(−1) deg]/[7.5 deg/s−4.5 deg/s]=⅓ s

Time delay (blade 108c)=[−1 deg−(−1) deg]/[7.5 deg/s−4.5 deg/s]=0 s

It is noted that the time delay for the blade 108c, which has the smallest blade angle upon initiation of the shutdown condition is zero seconds. In other words, the blade 108 with the smallest blade angle begins to immediately pitch toward feather at the final pitch rate of approximately 7.5 degrees/second. It is also noted that the blade 108a, which has the largest blade angle upon initiation of the shutdown begins to pitch toward feather at the initial pitch rate of approximately 4.5 degrees/second until it reaches the approximately the same or identical blade angle of the blade 108c (about 4 degrees) at about 25.67 seconds, and then the pitch rate switches to the final pitch rate of approximately 7.5 degrees/second. It is also noted that the blade 108b also begins to pitch toward feather at the initial pitch rate of approximately 4.5 degrees/second until its blade angle is approximately the same as the blade angle of blade 108c (about 1 degrees) at about 25.33 seconds, and then the pitch rate switches to the final pitch rate of approximately 7.5 degrees/second. It will be appreciated that the initial pitch rates of the blades 108a and 108b may be different. For example, the blade 108a may have an initial pitch rate of about 4 degrees, while the blade 108b may have an initial pitch rate of about 5 degrees, which are both smaller than the final pitch rate of about 7.5 degrees.

As described above, the invention provides a simple, time-based correction of initial conditions during shutdown to reduce the extreme loads on turbine components.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for reducing load in a wind turbine having a plurality of blades, each blade having a blade angle, said method comprising calculating a time delay for switching at least one blade toward feather from an initial pitch rate to a final pitch rate upon initiation of a shutdown condition, wherein the initial pitch rate is smaller than the final pitch rate; and switching the at least one blade to the final pitch rate once the time delay has expired, wherein the time delay is calculated by the following equation:

$$\text{Delay}(i) = [\text{Angle}(i) - \text{Min Angle}]/[\text{Final Pitch Rate} - \text{Initial Pitch Rate}(i)]$$

where,

Delay (i)=the time delay for i-th blade to switch from the initial pitch rate to the final pitch rate, Angle (i)=the blade angle of the i-th blade upon initiation of the shutdown condition, Min Angle=a minimum angle for the plurality of blades upon initiation of the shutdown condition, Initial Pitch Rate (i)=the initial pitch rate of the i-th blade under auxiliary power, and Final Pitch Rate=the final pitch rate under auxiliary power.

2. The method of claim 1, wherein at least one blade of the plurality of blades with a minimum blade angle pitches toward feather with the final pitch rate until all the other blades of the plurality of blades have reached approximately an identical blade angle.

3. The method of claim 1, wherein at least one blade of the plurality of blades with a maximum blade angle pitches toward feather with the initial pitch rate until all the other blades of the plurality of blades have reached approximately an identical blade angle.

4. The method of claim 1, wherein at least one blade of the plurality of blades pitches toward feather with the initial pitch rate until all the other blades of the plurality of blades have reached approximately an identical blade angle.

5. A wind turbine comprising a rotor having a plurality of blades and a hub, the wind turbine also comprising a control system configured to measure a pitch angle for each blade, wherein the control system calculates a time delay for switching at least one blade toward feather from an initial pitch rate to a final pitch rate upon initiation of a shutdown condition, wherein the initial pitch rate is smaller than the final pitch rate, wherein the time delay is calculated by the following equation:

$$\text{Delay}(i) = [\text{Angle}(i) - \text{Min Angle}] / [\text{Final Pitch Rate} - \text{Initial Pitch Rate}(i)]$$

where,

Delay $(i)$ = the time delay for i-th blade to switch from the initial pitch rate to the final pitch rate, Angle $(i)$ = the blade angle of the i-th blade upon initiation of the shutdown condition, Min Angle = a minimum angle for the plurality of blades upon initiation of the shutdown condition, Initial Pitch Rate(i) = the initial pitch rate of the i-th blade under auxiliary power, and Final Pitch Rate = the final pitch rate under auxiliary power.

6. The system of claim 5, wherein at least one blade of the plurality of blades with a minimum blade angle pitches toward feather with the final pitch rate until all the other blades of the plurality of blades have reached approximately an identical blade angle.

7. The system of claim 5, wherein at least one blade of the plurality of blades with a maximum blade angle pitches toward feather with the initial pitch rate until all the other blades of the plurality of blades have reached approximately an identical blade angle.

8. The system of claim 5, wherein at least one blade of the plurality of blades pitches toward feather with the initial pitch rate until all the other blades of the plurality of blades have reached approximately an identical blade angle.

* * * * *